(12) United States Patent
Cobene et al.

(10) Patent No.: US 8,128,237 B2
(45) Date of Patent: Mar. 6, 2012

(54) PLURALITY OF SELF-ACTIVATING DISPLAY SHAPING DEVICES DEFINING A DISPLAY AREA

(75) Inventors: Robert L. Cobene, Palo Alto, CA (US); Jeffrey M. DiCarlo, Palo Alto, CA (US); Glen E. Montgomery, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1256 days.

(21) Appl. No.: 11/881,555

(22) Filed: Jul. 27, 2007

(65) Prior Publication Data

US 2009/0027305 A1    Jan. 29, 2009

(51) Int. Cl.
*G03B 21/14*    (2006.01)
*G09G 5/02*    (2006.01)
*G01P 3/36*    (2006.01)
*G01N 21/85*    (2006.01)
*G01J 1/42*    (2006.01)
*H01L 31/00*    (2006.01)

(52) U.S. Cl. .......... 353/69; 345/614; 345/695; 345/698; 356/28; 356/411; 356/435; 356/222; 257/59; 257/72; 257/440

(58) Field of Classification Search ............... 353/69; 345/614, 694, 695, 698; 356/28, 411, 435, 356/222; 257/59, 72, 232, 414, 440, 254
See application file for complete search history.

(56) References Cited

U.S. PATENT DOCUMENTS 6,970,155 B2 * 11/2005 Cabrera ................. 345/107
2005/0264472 A1 * 12/2005 Rast ....................... 345/30

OTHER PUBLICATIONS

N. L. Chang, "Efficient Defense Correspondences using Temporally Encoded Light Patterns." IEEE International Workshop on Projector-Camera Systems (ProCams), Nice, France, Oct. 12, 2003.

* cited by examiner

*Primary Examiner* — Georgia Y Epps
*Assistant Examiner* — Magda Cruz

(57) ABSTRACT

A computer implemented method for utilizing a plurality of self-activating display shaping devices to provide shape adjustment information for a digital image projected on a display is disclosed. In one embodiment, the plurality of display shaping devices are automatically activated, the plurality of display shaping devices defining a desired digital image shape for a display. In addition, the plurality of display shaping devices is utilized to identify an actual projected digital image shape. The actual projected digital image shape is then compared with the desired digital image shape for the display. Correction information is then provided for adjusting the actual projected digital image shape to approximate the desired digital image shape for the display.

8 Claims, 7 Drawing Sheets

PLURALITY OF SELF-ACTIVATING DISPLAY SHAPING DEVICES DEFINING A DISPLAY AREA

TECHNICAL FIELD

Embodiments of the present technology relate to digital projection.

BACKGROUND

Digital projectors are used in media presentation environments such as business meetings, home theaters and the like. In general, the digital projector has taken the place of overhead projectors, slide projectors, and other devices used for showing visual presentations. Usually, digital projectors consist of a digital display technology such as Liquid Crystal Display (LCD), Digital Light Processing (DLP), or the like, for generating a digital image; and a light source for projecting the digital image. Herein, the terms display area or screen signifies the medium upon which the viewable projected image arrives.

For example, it is common in a meeting to connect a laptop or other computing system to a digital projector and then utilize the digital projector to project the content onto a display area that is significantly larger than the laptop's monitor. In so doing, everyone at the meeting can more easily observe the content (e.g., slideshow, video, real-time data, or the like).

In some applications, the digital projector is fixedly mounted, such as on the ceiling, and hardwired to an outlet or other computer system connector. However, in other applications, the digital projector may be portable.

Regardless of whether the digital projector is portable or fixedly mounted, there are a number of drawbacks with respect to the initial set-up of the digital projector. These drawbacks can be deleteriously time consuming and can cause significant user frustration.

For example, depending on the orientation between the digital projector and the selected display area, issues such as vertical and/or horizontal keystoning of the projected image may occur. In general, vertical keystoning refers to an image with varying width from top to bottom, while horizontal keystoning refers to an image with varying width from one side to the other.

Normally, vertical keystoning occurs when the digital projector is offset above or below the center of the display area. For example, if the digital projector is oriented below the center of the display area the lower portions of the projected image will travel a shorter distance than the upper portions. As such, the resultant projected image will appear "stretched" at the top or "squeezed" at the bottom.

In contrast, horizontal keystoning occurs when the digital projector is offset to one side of the display area. For example, if the digital projector is oriented to the right of the display area the right side of the projected image will travel a shorter distance than the left side. As such, the resultant projected image may appear "enlarged" toward the left, "shrunken" toward the right, or a combination thereof.

Either of the above stated keystoning issues will result in an undesirable projected image. Additionally, a combination of the above stated keystoning issues may result in a significantly skewed projected image requiring a number of corrective actions, none of which may be apparent. Moreover, if improper corrective actions are applied, one or both keystoning issues may be further exacerbated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computer implemented method for utilizing a plurality of self-activating display shaping devices to provide shape adjustment information for a digital image projected on a display is disclosed. In one embodiment, the plurality of display shaping devices are automatically activated, the plurality of display shaping devices defining a desired digital image shape for a display. In addition, the plurality of display shaping devices is utilized to identify an actual projected digital image shape. The actual projected digital image shape is then compared with the desired digital image shape for the display. Correction information is then provided for adjusting the actual projected digital image shape to approximate the desired digital image shape for the display.

BRIEF DESCRIPTION OF THE DRAWINGS

The accompanying drawings, which are incorporated in and form a part of this specification, illustrate embodiments of the present technology for mapping an active entry within a virtually hashed page table and, together with the description, serve to explain principles discussed below.

Figure 1:
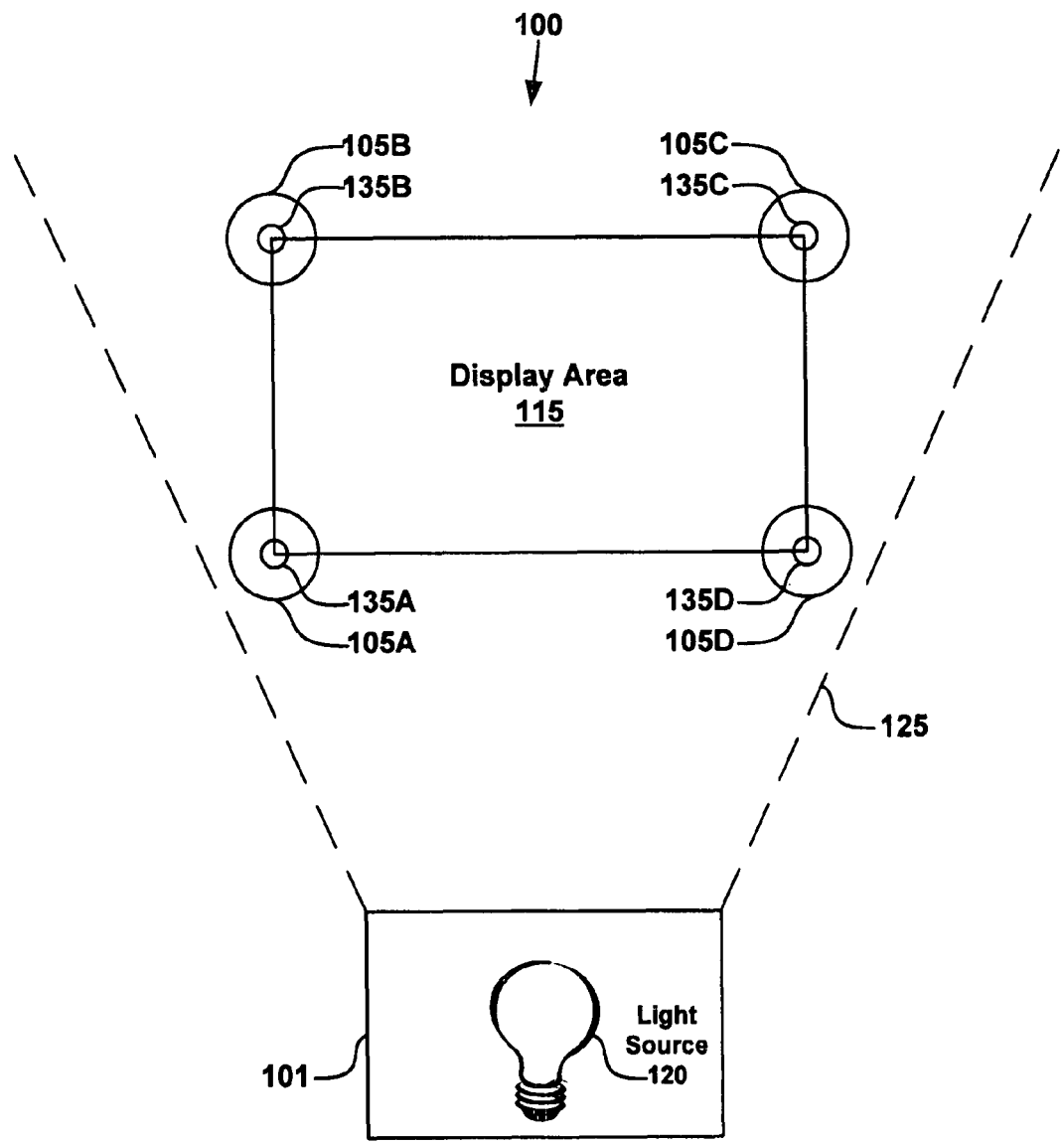
FIG. 1 is a block diagram of an example of a plurality of self-activating display shaping devices defining a display area, according to an embodiment of the present technology.

The drawings referred to in this description should not be understood as being drawn to scale unless specifically noted.

DETAILED DESCRIPTION

Reference will now be made in detail to embodiments of the present technology for mapping active entries within a virtually hashed page table, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims.

Furthermore, in the following detailed description, numerous specific details are set forth in order to provide a thorough understanding. However, the present technology may be practiced without these specific details. In other instances, well known methods, procedures, components, and circuits have not been described in detail as not to unnecessarily obscure aspects of the subject matter being described.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "activating", "utilizing", "comparing", "providing", "receiving", "selecting", "outputting", "accessing", "combining", "generating", "storing", "adjusting", "projecting", "repeating", "performing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

For purposes of the present discussion, a pixel as referred to herein is a basic unit of programmable color on a digital image. In addition, a bitmap is a file that indicates the location of each pixel along the horizontal axis or row (called the x coordinate) and along the vertical axis or column (called the y coordinate). As such, each pixel may be referenced based on its distinct x and y coordinates.

The present technology is directed toward any digital projection system available now or in the future that includes, or may incorporate, image mapping such as pixels.

Overview

In one embodiment, the present technology utilizes a plurality of self-waking devices to identify a desired shape of a display area. For example, four display shaping device may be placed upon a display area to outline and define a shape, such as a square, rectangle or any other shape. In one embodiment, each of the display shaping devices is continuously active and receives an activation signal which warns that a second signal will be forthcoming. However, in another embodiment, each of the display shaping devices remains inactive until an activation signal is received by a detector, such as a light sensor, within the display shaping device.

In one embodiment, a digital projector will send out the activation signal when starting up, or when so commanded. Presently, the activation signal may be one or more electromagnetic waves or audio signals. For example, the activation signal may be a series of horizontal and vertical bars, a sound, a sequence of flashes, a sequence of sounds, radio waves, or the like.

After sending out the activation signal, the digital projector will project a second signal onto the display. In general, the second signal is calibration information, provided in a sequence or pattern. Basically, the calibration information consists of a plurality of images, each image including a combination of horizontal and vertical bars, to form a pattern or sequence. In one embodiment, the calibration information provides a unique identifier for each individual pixel within the digital image being projected. However, in another embodiment, the calibration information provides a unique identifier for a plurality of groups of pixels within the digital image being projected. For purposes of clarity, the unique identifier is referred to herein as a pixel related pattern.

Upon receiving the activation signal, the display shaping device becomes fully activated (if not already fully activated) and is ready to receive the follow-on calibration information from the digital projector. Once detected, the calibration information is compared to pixel related patterns within a database coupled to the display shaping device to identify the corresponding pixel.

Information, such as, the selected pixel, the display shaping device's location, and/or correction information, is then transmitted from each of the display shaping devices. In general, the information is used to perform corrections with respect to the projection characteristics of the digital image such that the actual digital image being projected can be modified to approximate the desired shape of the projected display area. For example, the information may show that top to bottom keystoning is occurring. Additionally, the information may show that a projected image should be shifted to the left, right, up, down, and/or the image is too large. Moreover, the information may provide suggested user remedies such as accessing the onscreen vertical keystoning menu, or the like.

In addition, the entire sequence of events may be repeated until the actual projected image is within tolerances related to the desired display image area. If the corrections are being input manually, the present technology is well suited to providing oral or visual feedback to let the user know if the last correction was right or wrong. In another embodiment, the corrections may be performed automatically. That is, any adjustments may be automatically performed by the digital projector without any manual manipulations.

Structure

With reference now to FIG. 1, a block diagram of a system 100 for aligning digital image 125 generated by digital projector 101 within display area 115 is shown in accordance with an embodiment of the present technology. In general, system 100 includes a digital projector 101, a display area 115, and a plurality of display shaping device 105A, 105B, 105C, and 105D.

Digital projector 101 also includes a light source 120. Light source 120 could be a bulb, light emitting diode, etc. Basically, light source 120 is utilized to project the digital image 125. In different embodiments, digital projector 101 may also include automatic and/or manual adjustment modes.

Display area 115 is a region upon which the digital image 125 is projected. For example, display area 115 may be a screen, wall, shade, curtain, cloth, or the like. Basically, display area 115 is any location upon which digital image 125 may be viewed.

Display shaping devices 105A-105D are placed in predetermined locations within display area 115 in such a way as to define a desired shape for a digital image projected onto the display area 115. For example, display shaping device 105A-105D define a display region upon display area 115 by being placed in any number of shapes, such as a square, rectangle, diamond, etc. The area within these outlined shapes is deemed the display region. Although four display shaping devices 105A-105D are shown, any number may be used. However, four are described herein merely for purposes of clarity.

Additionally, in one embodiment, display shaping devices 105A-105D may be permanently encased within display area 115. However, if display shaping devices 105A-105D are encased, it is done in such as way as to still leave detector 135 exposed to the outside elements. Alternatively, display shaping devices 105A-105D may be removable from display area 115. The ability to remove display shaping devices 105A-105D from display area 115 may be accomplished in a variety of ways, such as by applying any number of coupling and decoupling tools to the backing of display shaping devices 105A-105D to allow its attachment to and removal from display area 115. These tools could be in a mechanical form such as but not limited to a tack, hanger, or tape, or in a liquid form such as but not limited to glue.

Each display shaping device 105A-105D includes a detector 135A, 135B, 135C, and 135D. In one embodiment, the detector is a light sensor. However, the present technology is not limited to light detection. For example, the detector may be an acoustic detector, a heat detector, a motion detector, or the like. Moreover, the detector may include characteristics of any or all of the detecting types stated herein. Although the utilization of a light detector is most often discussed herein. This is meant merely for purposes of clarity and is not meant to limit the type of detector, detection methods, or signal types which may be utilized by the present technology.

Figure 2:
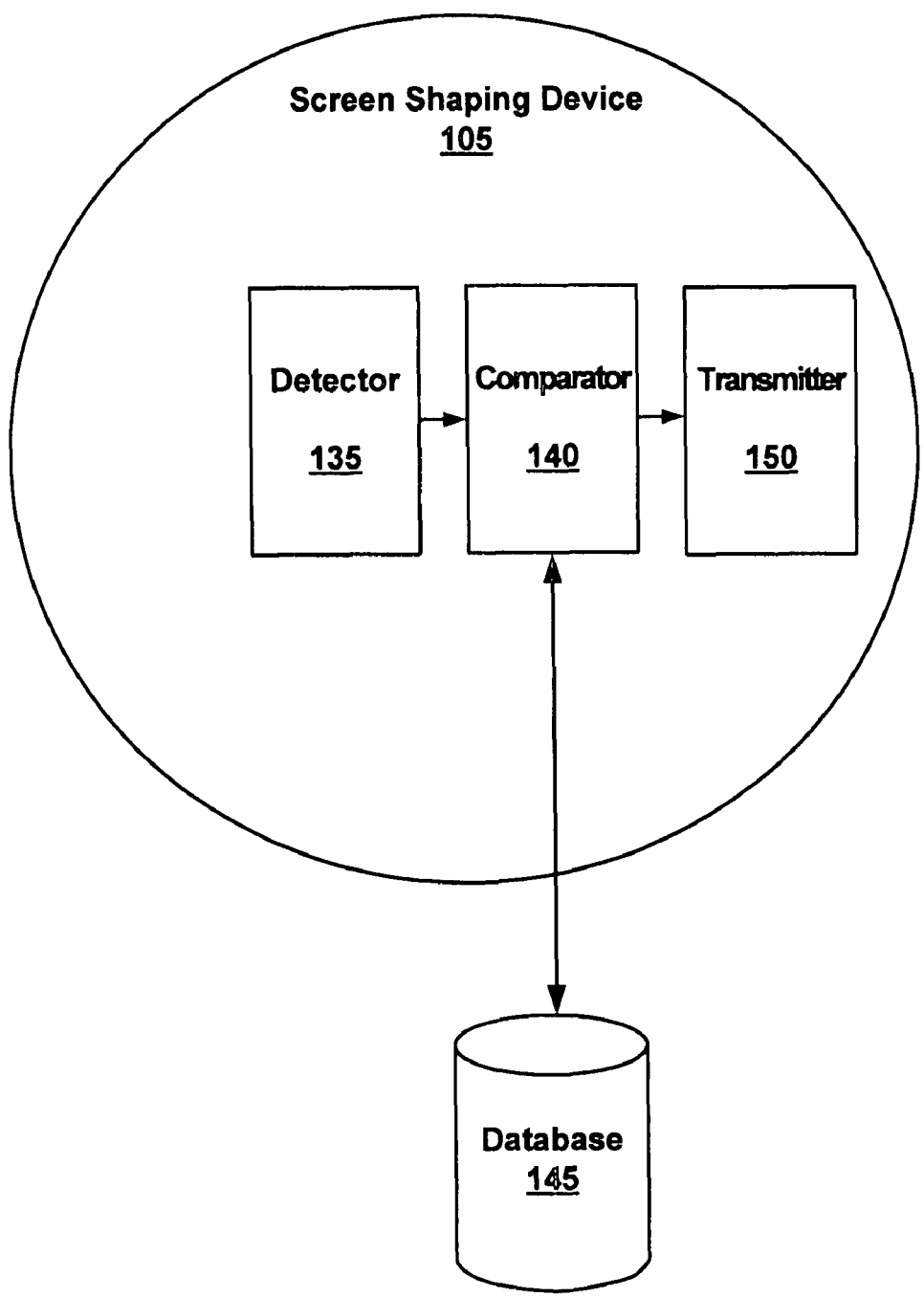
FIG. 2 is a block diagram of an exploded view of an example display shaping device as represented in FIG. 1, according to an embodiment of the present technology.

With reference now to FIG. 2, a block diagram of an exploded view of an example display shaping device 105 is shown according to an embodiment of the present technology. In one embodiment, display shaping device 105 includes but is not limited to detector 135, comparator 140, and transmitter 150. Moreover, in one embodiment, each component of display shaping device 105 is communicatively coupled to at least one other component of display shaping device 105. In one embodiment, a database 145 may be communicatively coupled to but physically separate from display shaping device 105. In another embodiment, database 145 is located within display shaping device 105.

In one embodiment, display shaping device 105 may be disk-shaped. However, it should be appreciated that display shaping device 105 may be any shape capable of containing and allowing operation of the aforementioned components. Additionally, detector 135 is encased within display shaping device 105 in such a way as to be fixed, yet exposed to elements such as light outside of the casing. For example, display shaping device 105 has a hole in one of its disk-shaped sides, with detector 135 directly below this hole. This exposure enables detector 135 to receive light information (any information associated with light) from light source 120, through this hole.

In one embodiment, detector 135 is configured for monitoring an environment for changes in light, and generating signals in response to these changes in light. Detector 135 detects at least a first signal and a second signal, and activates display shaping device 105 when a first signal is detected. In one embodiment, detector 135 is integral with display shaping device 105. In yet another embodiment, detector 135 is separate from but communicatively coupled to display shaping device 105. Detector 135 is also capable of establishing a pattern based on any detected signals.

In one embodiment, the activation signal is selected from the group of signals consisting of: a signal from the electromagnetic spectrum (e.g. ultraviolet, visible, infrared, microwave and radio wave ranges) an audible signal, a non-audible signal, an electromagnetic spectral pattern, an audible sequence and a non-audible sequence.

Comparator 140 is configured to receive a second signal from detector 135, compare this second signal with a plurality of pixel related patterns stored in database 145 and select one pixel related pattern from a plurality of pixel related patterns based on this comparing, in one embodiment. Comparator 140 may select the pixel in database 145 that matches the pattern received by detector 135. In another embodiment, a pixel related pattern may be selected from within database 145 that matches the signal that was received by detector 135 and then transmitted to comparator 140 (which functions as a carrier of the signal to database 145).

Transmitter 150 is configured to output information comprising an identity of display shaping device 105 and one pixel related pattern detected by display shaping device 105, in one embodiment. Transmitter 150 may receive information from comparator 140 about a pixel with the most related pattern and output the information. In one embodiment, the transmitter may be an infrared light emitting diode.

Operation

Figure 3:
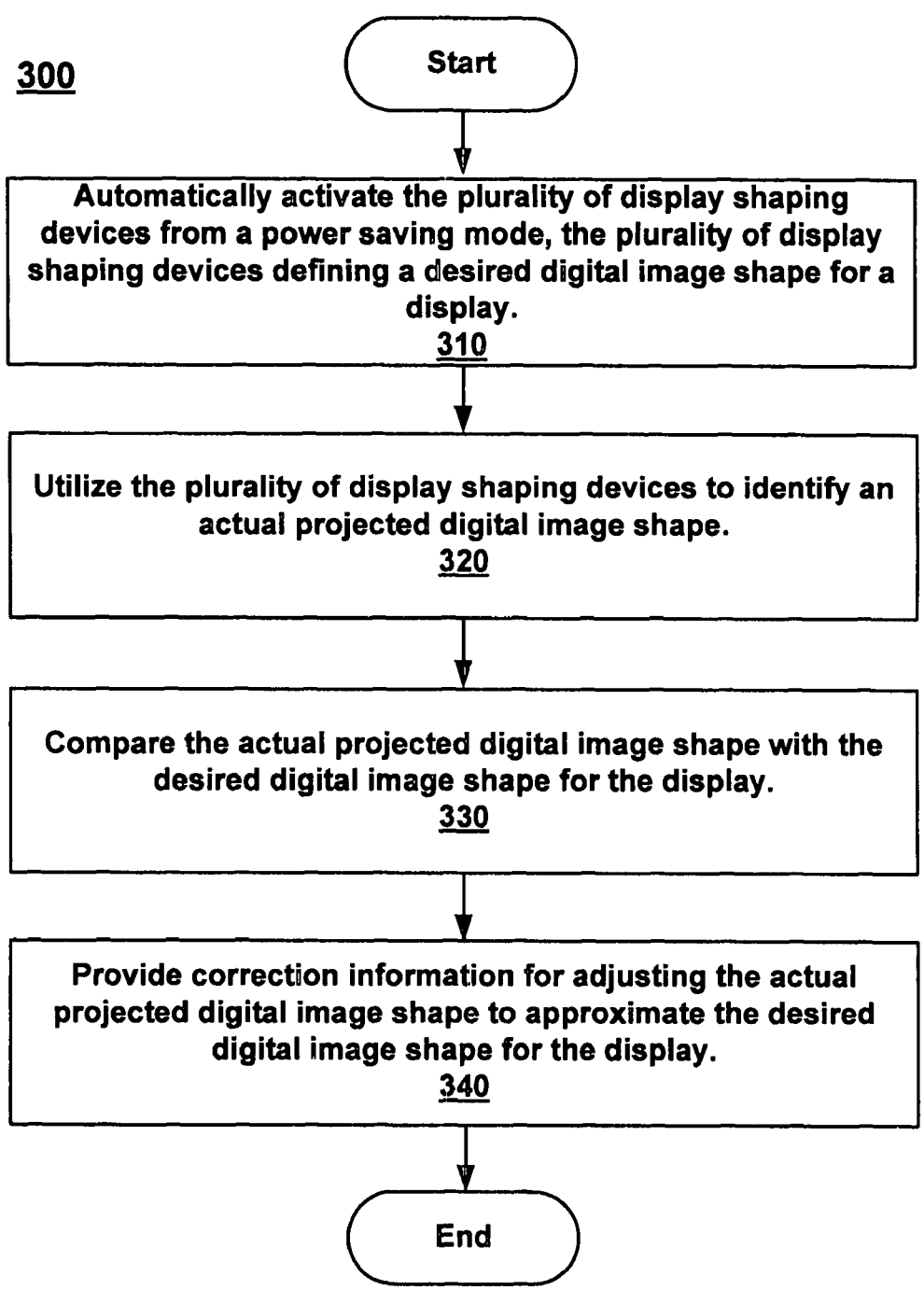
FIG. 3 is a flow diagram of an example method for utilizing a plurality of self-activating display shaping devices defining a display area, according to an embodiment of the present technology.

With reference now to FIG. 3, and to FIG. 1, a flow diagram of an example method for utilizing a plurality of self-activating display shaping devices to provide shape information with respect to digital image 125 projected on display area 115 is shown, according to an embodiment of the present technology.

Referring now to 310 of FIG. 3, one embodiment automatically activates the plurality of display shaping devices 105A-105D. In one embodiment, the plurality of display shaping devices 105A-105D is activated while being in power saving mode. Power saving mode may be any mode which enables the efficient use of power. In another embodiment, the plurality of display shaping devices 105A-105D is activated from a powered down mode. As described herein, the plurality of display shaping devices 105A-105D define a desired digital image shape for a display area 115.

In one embodiment, the waking or activating of the plurality of display shaping devices 105A-105D occurs on a device by device basis. That is, each display shaping device 105 receives an activation signal at detector 135. In one embodiment, the activation signal is a pattern of light changes detected by a light sensor portion of detector 135 that matches a previously established activation pattern. In one embodiment, the activation signal is sent from digital projector 101. However, in another embodiment, the activation signal may be sent from any number of devices, and may be something other than a pattern of light changes.

Detector 135 monitors an environment for a change in light or other conditions and generates one or more signals in response to the changes. For example, in response to a detected change detector 135 may, for a pre-determined period of time, raise its power settings and actively monitor for a predefined activation signal. In addition, detector 135 may signal a light emitting diode coupled with the display shaping device 105 to be activated for the same pre-determined period of time. Once this pre-determined period of time has elapsed, then detector 135 may return to a lower power mode and signal light emitting diode to stop emitting light.

For example, suppose an overhead light is turned on, and a beam of light hits detector 135A of display shaping device 105A. Detector 135A may raise its power settings and signal a light emitting diode to activate. In one instance, detector 135A may continue at the heightened awareness for the pre-programmed time before returning to a lower power state and signaling light emitting diode to deactivate. However, during the time of heightened awareness, detector 135A is capable of receiving an activation signal which would cause detector 135A to activate all of the components within display shaping device 105D. In another embodiment, detector 135A may receive the activation signal at any time regardless of whether or not it is in a state of heightened awareness.

In one embodiment, in response to receiving a signal, detector 135 will compare the received signal with its own activation signal. If the signals match, then detector 135 will activate all of the components within display shaping device 105D. For instance, detector 135A receives and verifies an activation signal sent by digital projector 101 and provides an activation signal to display shaping device 105A. By waking up display shaping device 105A, detector 135a has prepared display shaping device 105A to receive and process any follow-on calibration information sent by digital projector 101. In one embodiment, the calibration information is light information presented on a number of images in the form of horizontally striped and/or vertically striped light patterns possibly having varying widths.

Referring now to 320 of FIG. 3 and to FIG. 2, one embodiment utilizes the plurality of display shaping devices 105A-105D to identify an actual projected digital image shape 125. For example, in one embodiment, detector 135 receives the calibration signal and establishes a pattern based on the calibration signal. Detector 135 then passes the pattern to comparator 140. Comparator 140 will access database 145 of pixel related patterns and then compare the pattern with a plurality of pixel related patterns. Comparator will also select one of the pixel related patterns from the plurality of pixel related patterns. For example, comparator 140 may select a pixel related pattern that most closely resembles the pattern received from detector 135. In one embodiment, the resulting match will not only identify a specific pixel, but will also include the x and y coordinates of the pixel within the image.

For example, working with a matrix containing $100^2$ pixels, if the lower left display shaping device is determined to be the origin (0,0), then all other pixel coordinate locations are determined based on the lower left display shaping device. For example, the pixel directly above the light sensor for the lower left display shaping device is at (0, 0). The pixel directly above the light sensor for the upper left display shaping device is found to be at (0, 80). The pixel directly above the light sensor for the upper right display shaping device is found to be at (90, 80). Furthermore, the pixel directly above the light sensor for the lower right display shaping device is found to be at (90, 0). Hence, the set of horizontal and/or vertical patterns are translated into x and y coordinates identifying each pixel's location within the image.

Once comparator 140 selects a pixel and its location within an image, the results are provided to transmitter 150 which outputs information related to the specific display shaping device 105 and the pixel which it selected. In one embodiment, the output information may be transmitted by an infrared light emitting diode coupled to display shaping device 105.

In general, the output information may identify the specific display shaping device's 105 location on display area 115, its relationship to other display shaping devices 105, or the like. In addition, the output information may include a simple naming reference, the actual x and y coordinates, or any other information which may identify the selected pixel or pixel related pattern.

In one embodiment, the resulting information for each of the plurality of display shaping devices 105A-105D is combined to define the actual projected digital image shape 125. For example, the location of each display shaping device 105A-105D and the pixel selected by each display shaping device 105A-105D are sent to digital projector 101 which can utilize the information to generate a rough outline of the actual projected digital image shape 125 being displayed on display area 115.

In another embodiment, display shaping device 105A-105D are arranged upon display area 115 in a pre-determined order so that the transmission of information enables the resulting digital image to remain upright.

For example, the display shaping devices 105A-105D each transmit portions of information to digital projector 101 according to a pre-determined order. By placing display shaping devices 105A-105D in a pre-determined order, regardless of the physical position of digital projector 101, the image projected will remain upright. For example, if digital projector 101 is flipped upside down and an image is projected upon display area 115 region defined by ordered display shaping devices 105A-105D, then actual projected digital image shape 125 will remain upright. However, if display shaping devices 105A-105D are out of order, then the actual projected digital image shape 125 may be inverted, or flipped in an undesirable direction, requiring manual manipulation of digital projector 101 to move the image to the upright position.

An example of the pre-determined order is the following: display shaping device 105A is be placed in the lower left hand corner; display shaping device 105B is placed in the upper left hand corner; display shaping device 105C is placed in the upper right hand corner; and display shaping device 105D is placed in the lower right hand corner. Initially, display shaping device 105A outputs a result to digital projector 101 first. Then, display shaping device 105B outputs a result to digital projector 101 second. Display shaping device 105C outputs a result to digital projector 101 third. Finally, display shaping device 105D outputs a result to digital projector 101 fourth. In this manner, no matter which way the light sent from light source 120 is flipped, actual projected digital image shape 125 remains upright.

Figure 4:
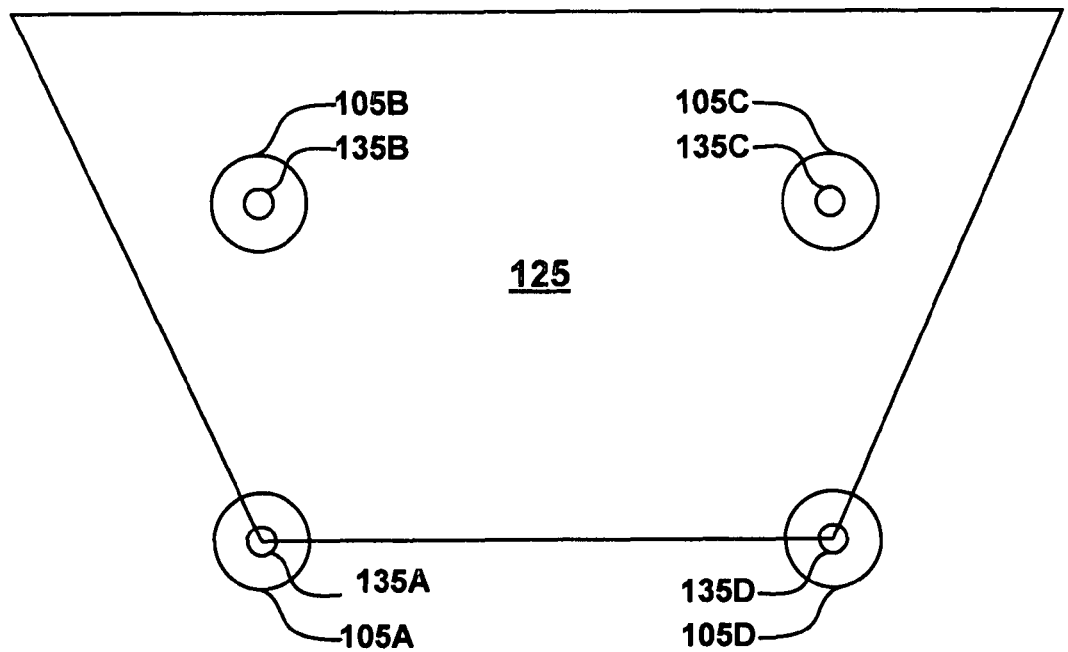
FIG. 4 is an example of an initial image being projected upon a display area according to an embodiment of the present technology.

Referring now to 330 of FIG. 3 and to FIG. 4, one embodiment compares the actual projected digital image shape 125 with the desired digital image display shape 115. For example, FIG. 4 illustrates an actual projected digital image shape 125 upon display area 115 undergoing calibration. In this example, display shaping devices 105A-105D are placed in the shape of a square, while actual projected digital image shape 125 is vertically keystoned. That is, the width of actual projected digital image shape 125 is greater at the top than at the bottom.

In another embodiment, the output information provided by the plurality of display shaping device 105A-105D may be correction information based on a comparison performed at each of the display shaping devices 105A-105D. For example, if display shaping device 105D knows it is in the bottom right of display area 115, display shaping device 105D would expect to receive a pixel related pattern identifying a pixel located in the bottom right area (within some pre-established tolerance) of the image. Based on this known information, upon identifying the pixel's location within an image, comparator 140, or other component within display shaping device 105D, would be able to provide information comparing the portion of image received with the desired digital image shape for display area 115.

Upon receiving the correction information from each of the plurality of display shaping devices 105A-105D. A comparison of the actual projected digital image shape 125 and the desired digital image shape for display area 115 would be provided. For example, the correction information includes information as to the actual projected digital image shape 125 fitting both horizontally and/or vertically with respect to display area 115. Additionally, the correction information includes instructions on shifting the actual projected digital image shape 125 to the left, right, up, down, and/or making the overall image smaller because the image is to large.

Figure 5:
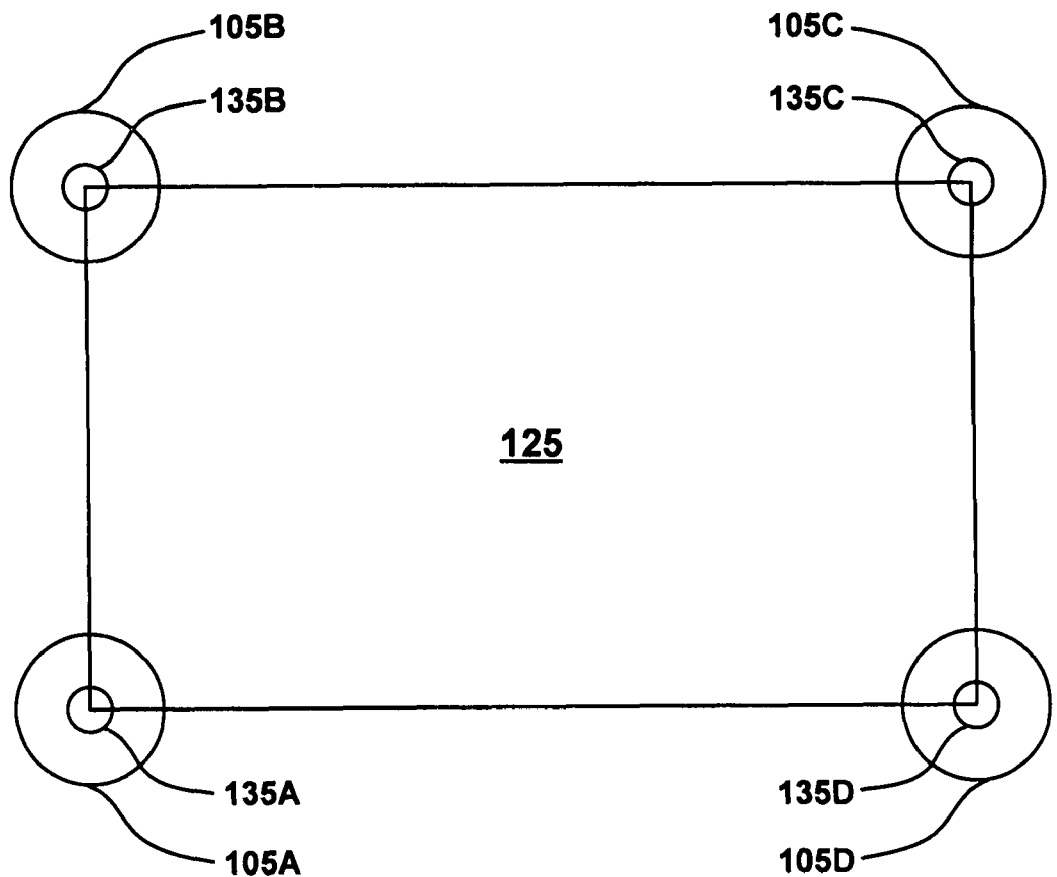
FIG. 5 is an example of an adjusted image being projected upon a display area according to an embodiment of the present technology.

Referring now to 340 of FIG. 3 and to FIG. 5, one embodiment provides correction information for adjusting the actual projected digital image shape 125 to approximate the desired digital image display shape 115. For example, after comparing the actual projected digital image shape 125 and the desired digital image display shape 115, the resulting corrections are used to adjust the actual projected digital image shape 125.

In one embodiment, digital projector 101 may utilize the correction information provided, or its own calculated correction information to adjust actual projected digital image shape 125 to better fit the shape of the desired projected display area 115. In one embodiment, the adjustment is automatic. That is, the adjustment is made without any manual manipulations of digital projector 101.

Moreover, after performing the correction to the actual projected digital image shape 125, any or all of the process may be repeated until the correction information is less than or equal to a pre-determined margin of error.

However, in one embodiment, information may not be received from all of the plurality of display shaping device 105A-105D. For example, adjustment or correction information may be received from display shaping device 105A, display shaping device 105B and display shaping device 105D, but not from display shaping device 105C. In this case, a number of options exist.

For example, suppose the display shaping device 105C has not been previously heard from. For example, since the previous calibration performed two days ago, one option assumes that actual projected digital image shape 125 did not cover display shaping device 105C and as such, the correction information may include an adjustment to actual projected digital image shape 125 such that display shaping device 105C will definitely be covered during the subsequent round of adjustment. If information is subsequently received from each of the display shaping devices including display shaping device 105C, then the issue is resolved.

However, if in the subsequent round of adjustments, an adjustment that ensured display shaping device 105C would receive the wake-up and the calibration signals also results in no information being received from display shaping device 105C, then it may be assumed that display shaping device 105C is malfunctioning or non-functional and further technical assistance may be necessary with respect to display shaping device 105C. At the same time, any additional correction information would be generated with the understanding of three display shaping devices 105 instead of four.

In yet another case, suppose display shaping device 105C has been previously heard from. For example, prior to the most previous adjustment, it may be assumed that the adjustment to actual projected digital image shape 125 uncovered display shaping device 105C. As such, the next adjustment to actual projected digital image shape 125 may include a correction such that display shaping device 105C will again be covered during the subsequent calibration projection. If information is subsequently received from each of the display shaping devices including display shaping device 105C, then the issue is resolved. However, if no information is received from display shaping device 105C, then it may be assumed that display shaping device 105C is malfunctioning or non-functional and further technical assistance may be necessary with respect to display shaping device 105C. At the same time, any additional correction information would be generated with the understanding of three display shaping devices 105 instead of four.

Referring now to FIG. 5, an example of an adjusted actual projected digital image shape 125 on display area 115 is shown, according to an embodiment of the present technology. Basically, an automatic vertical keystoning correction was sent to digital projector 101. Digital projector 101 applied the vertical keystoning correction to actual projected digital image shape 125 of FIG. 4. The resulting adjusted actual projected digital image shape 125 of FIG. 5 now approximates the desired digital image shape for display area 115.

If actual projected digital image shape 125 of FIG. 4 had been horizontally keystoned, horizontal keystoning correction of actual projected digital image shape 125 would have been applied instead. As stated herein, the aligning of actual projected digital image shape 125 to the desired projected display area shape 115 may be done automatically or manually. That is, the corrections may be provided to digital projector 101 manually, or digital projector 101 may automatically perform the corrections.

In one embodiment, the present technology automatically and periodically reviews actual projected digital image shape 125 to ensure it remains within the desired projected display area shape tolerances. For example, digital projector 101 may be pre-programmed to initiate the adjustment process for actual projected digital image shape 125 every twenty minutes.

Figure 6:
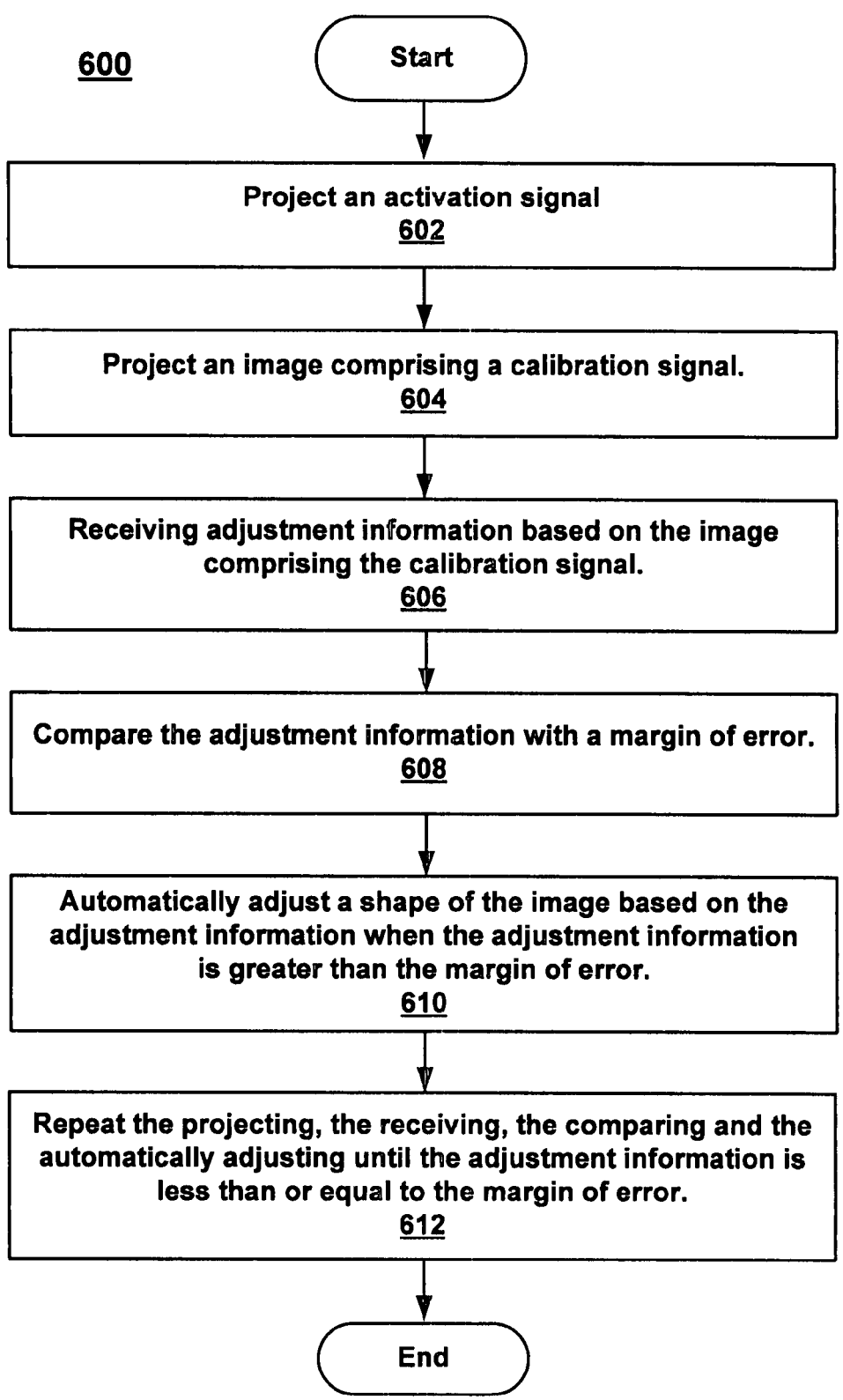
FIG. 6 is a flow diagram of an example method for adjusting a digital image with respect to a display area, according to an embodiment of the present technology.

Referring now to 600 of FIG. 6 and to FIG. 1, a flow diagram of an example method for automatically adjusting a shape of an image projected by a digital projector is shown, according to an embodiment of the present technology.

Referring now to 602 of FIG. 6 and to FIG. 1, one embodiment projects an activation signal. In one embodiment, the activation signal is selected from the group of signals consisting of: a signal from the electromagnetic spectrum (e.g. ultraviolet, visible, infrared, microwave and radio wave ranges) an audible signal, a non-audible signal, an electromagnetic spectral pattern, an audible sequence and a non-audible sequence. As described herein, the signal serves as the activation signal for detector 135.

Referring now to 604 of FIG. 6 and to FIG. 1, one embodiment projects an image including a calibration signal. In one embodiment, the calibration signal, as described herein, is a combination of horizontally striped and/or vertical striped binary light patterns. However, the calibration signal may be any type of signal within a projected image that delineates between pixels, groupings of pixels, quadrants of an image, or any other designation method for distinguishing portions of a projected digital image.

Referring now to 606 of FIG. 6 and to FIG. 4, one embodiment receives adjustment information based on the image including the calibration signal. As described herein, the adjustment information may include information pertaining to vertical and/or horizontal keystoning. In one embodiment, the information may be received by an infrared receiver.

As described herein, the information may be received from at least one of the plurality of display shaping device 105A-105D. Additionally, the information may be received from all of a plurality of display shaping device 105A-105D.

Referring now to 608 of FIG. 6 and to FIG. 5, one embodiment compares the adjustment information with a margin of error. For example, the difference between the actual projected digital image shape 125 and the desired digital image shape for display area 115 is calculated. If the difference is less than or equal to a margin of error, e.g., a specified tolerance, then further projecting of the calibration signal is automatically ended and no adjustment is made with respect to the actual projected digital image shape 125.

Referring now to 610 of FIG. 6 and to FIG. 4, if the difference is greater than the margin of error, the shape of actual projected digital image shape 125 is adjusted based on the received adjustment information. For example, as described herein, digital projector 101 may perform alignments based upon the receipt of an obtained result. These alignments may be, but are not limited to, vertical and horizontal keystoning corrections of actual projected digital image shape 125.

Referring now to 612 of FIG. 6 and to FIG. 4, one embodiment repeats the projection of 602 and 604, the receiving of 606, the comparing of 608, and the aligning of 610, until the difference between the actual projected digital image shape 125 and the desired digital image shape for display area 115 is less than or equal to the margin of error. At that time, further projecting of the calibration signal is automatically ended and no further adjustments are made with respect to the actual projected digital image shape 125.

However, as described herein, in one embodiment, the present technology may automatically and periodically review actual projected digital image shape 125 to ensure it remains within the desired projected display area shape tolerances. For example, digital projector 101 may be pre-programmed to initiate the adjustment process for actual projected digital image shape 125 every twenty minutes, two days, three weeks, monthly, or the like.

Thus, the present technology provides a plurality of self-activating devices to identify a shape of an actual projected digital image on a display area. In addition, the present technology compares the shape of the actual projected digital image with a desired projected digital image shape. Moreover, the present technology provides correction information to a source of the projected digital image, the correction information for modifying the shape of the actual projected digital image to approximate a pre-defined shape within the display area, by providing a method to align digital image 125 other than through cumbersome manual techniques of repositioning digital projector 101, the present technology reduces frustration, and saves time and money.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Example Computer System Environment

Figure 7:
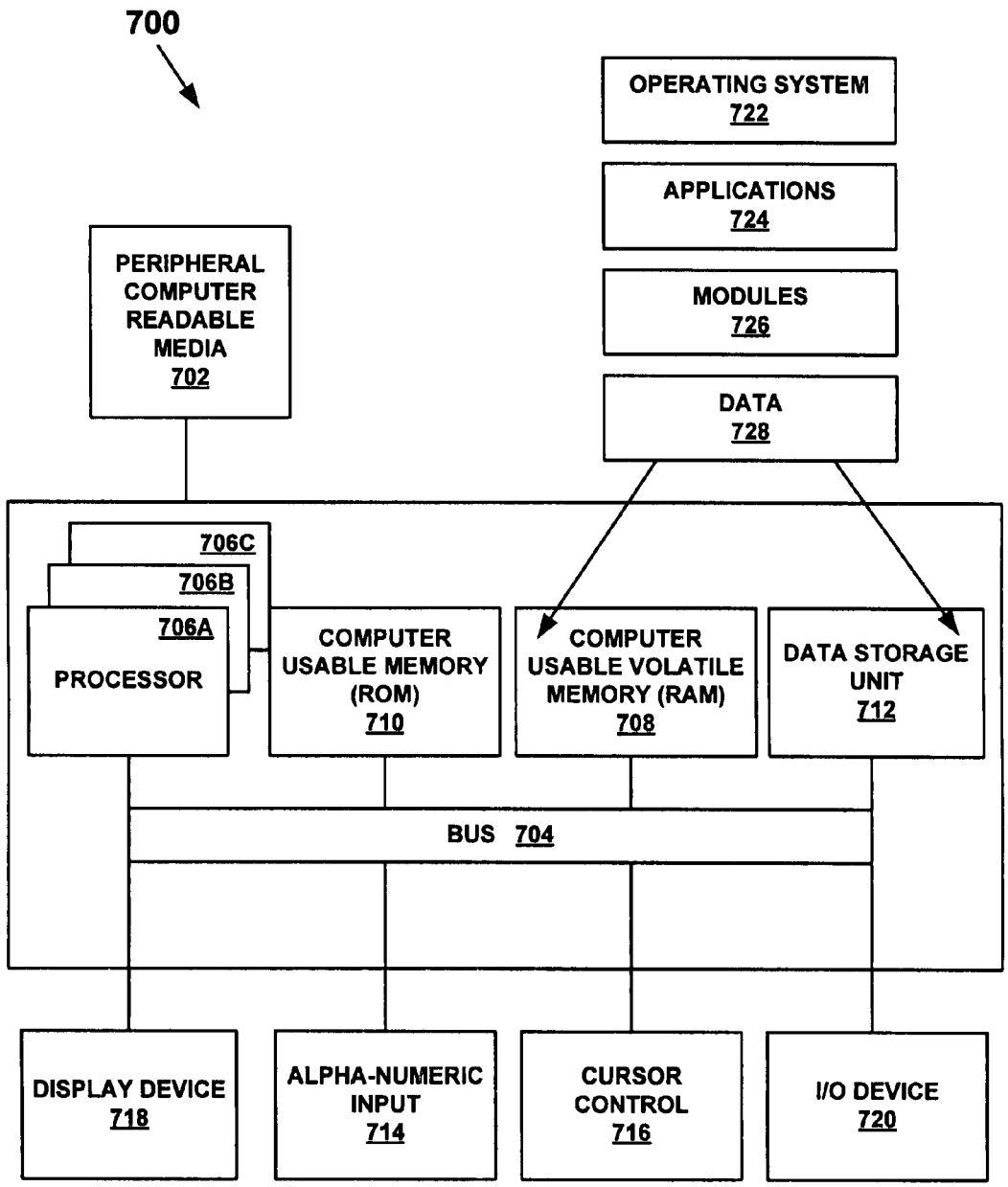
FIG. 7 is a diagram of an example computer system used in accordance with embodiments of the present technology.

With reference now to FIG. 7, portions of the present technology are composed of computer-readable and computer-executable instructions that reside, for example, in computer-usable media of a computer system. That is, FIG. 7 illustrates one example of a type of computer that can be used to implement embodiments, which are discussed below, of the present technology. FIG. 1 illustrates an example computer system 700 used in accordance with embodiments of the present technology. It is appreciated that system 700 of FIG. 7 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors.

System 700 also includes data storage features such as a computer usable volatile memory 708, e.g. random access memory (RAM), coupled to bus 1704 for storing information and instructions for processors 706A, 706B, and 1706C. System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions.

System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 may be a liquid crystal device, cathode ray tube, plasma display device or other display device suitable for creating, presenting, or displaying graphic images and/or symbols or alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick, directional and input keys on a multimedia remote control, or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands. System 700 is also well suited to having a cursor directed by other means such as, for example, voice commands.

System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. In one embodiment, the present technology is stored, for example, as an application 724 or module 726 in memory locations within RAM 708, computer readable media within data storage unit 712, and/or peripheral computer readable media 702.

The computing system 700 is only one example of a suitable computing environment and is not intended to suggest any limitation as to the scope of use or functionality of the present technology. Neither should the computing environment 700 be interpreted as having any dependency or requirement relating to any one or combination of components illustrated in the exemplary computing system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

What is claimed is:

1. A plurality of self-activating display shaping devices defining a display area, each of said plurality of said self-activating display shaping devices comprising:
   a detector for detecting at least a first signal and a second signal, said detector activating said display shaping device when said first signal is detected;
   a comparator configured to receive said second signal from said detector, compare said second signal with a plurality of pixel related patterns stored in a database and select one pixel related pattern from said plurality of pixel related patterns based on said comparing; and
   a transmitter configured to output information comprising an identity of said display shaping device and the one pixel related pattern detected by said display shaping device.

2. The display shaping device of claim 1, wherein said first signal and said second signal are selected from the group of signals consisting of: a signal from an electromagnetic spectrum, an audible signal, a non-audible signal, an electromagnetic spectral pattern, an infrared pattern, an audible pattern and a non-audible pattern.

3. The display shaping device of claim 1, wherein said detector is a light sensor.

4. The display shaping device of claim 1, wherein said output information further comprises information related to a location of said display shaping device within said display area.

5. The display shaping device of claim 1 wherein each of said plurality of pixel related patterns identifies a specific pixel and its location within said digital image.

6. The display shaping device of claim 1 wherein each of said plurality of pixel related patterns identifies a specific group of pixels and their location within said digital image.

7. The display shaping device of claim 1, further comprising:
   a microcontroller; and
   a battery configured to power at least a portion of said display shaping device.

8. The display shaping device of claim 1, further comprising:
   a light emitting diode configured to glow in response to said detector detecting a change in lighting.

* * * * *